United States Patent
Komatsu

(10) Patent No.: US 7,548,813 B2
(45) Date of Patent: Jun. 16, 2009

(54) METHOD AND APPARATUS FOR MAP MATCHING

(75) Inventor: Michihisa Komatsu, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 484 days.

(21) Appl. No.: 11/243,513

(22) Filed: Oct. 4, 2005

(65) Prior Publication Data

US 2006/0080033 A1    Apr. 13, 2006

(30) Foreign Application Priority Data

May 10, 2004    (JP)    ............................. 2004-292285

(51) Int. Cl.
    *G01C 21/30*    (2006.01)
(52) U.S. Cl. ................. 701/209; 701/211; 701/212; 342/357.13; 342/357.14; 340/990; 340/995.17; 340/995.22
(58) Field of Classification Search ............... 701/216, 701/94, 207–210, 214; 342/357.13, 357.14; 340/990, 995.17, 995.22, 995.27
See application file for complete search history.

(56) References Cited

U.S. PATENT DOCUMENTS

| 5,574,649 | A  | * | 11/1996 | Levy .......................... 701/207 |
| 5,774,824 | A  |   | 6/1998  | Streit et al. |
| 6,115,668 | A  | * | 9/2000  | Kaneko et al. .............. 701/207 |
| 6,308,134 | B1 | * | 10/2001 | Croyle et al. ................ 701/220 |
| 7,349,802 | B2 | * | 3/2008  | Lee et al. .................... 701/209 |

FOREIGN PATENT DOCUMENTS

JP          10-253373         9/1998

* cited by examiner

*Primary Examiner*—Gertrude Arthur Jeanglaud
(74) *Attorney, Agent, or Firm*—Brinks Hofer Gilson & Lione

(57) ABSTRACT

A navigation apparatus and a map matching method are provided. An acceleration sensor detects an acceleration of the vehicle. A gradient determination section determines an angle of inclination of the road link being currently traveled or a value corresponding to the inclination angle. A gradient determination section determines a vertical distance traveled based on the inclination angle and the speed of the vehicle. The accumulated value of the vertical distance is then compared to a set value to determine whether a road link is a downgrade link or an upgrade link. A map matching processor performs map matching processing using a result of the determination and the gradient information.

10 Claims, 10 Drawing Sheets

VERTICAL DEVIATION

FIG. 4

LINK RECORD

| ITEM NUMBER | OFFSET | DATA LENGTH | ITEM NAME |
|---|---|---|---|
| 1 | 0 | 8 | LINK ID |
| 2 | 8 | 2 | NODE NUMBER 1 |
| 3 | 10 | 2 | NODE NUMBER 2 |
| 4 | 12 | 2 | LINK DISTANCE (m) |
| 5 | 14 | 2 | COST |
| 6 | 16 | 1 | ROAD CLASSIFICATION FLAG |
| 7 | 17 | 1 | ROAD ATTRIBUTE FLAG/LANE WIDTH INFORMATION |
| 8 | 18 | 2 | HIGHWAY CODE |
| 9 | 20 | 4 | ROUTE NUMBER |
| 10 | 24 | 1 | NUMBER OF LANES |
| 11 | 25 | 1 | NUMBER OF SIGNALS |
| 12 | 26 | 1 | TRAFFIC REGULATION FLAG IN DIRECTION FROM NODE NO. 1 TO NO. 2 |
| 13 | 27 | 1 | TRAFFIC REGULATION FLAG IN DIRECTION FROM NODE NO. 2 TO NO. 1 |
| 14 | 28 | 1 | AZIMUTH OF ROAD GEOMETRY IN DIRECTION FROM NODE NO. 1 TO NO. 2 |
| 15 | 29 | 1 | AZIMUTH OF ROAD GEOMETRY IN DIRECTION FROM NODE NO. 2 TO NO. 1 |
| 16 | 30 | 1 | GRADIENT (UP/DOWN/FLAT) |

HIGHWAY AND GENERAL ROAD LYING IN PARALLEL

SIDE ROAD/ARTERIAL ROAD LOCATED AT INTERCHANGE

EXAMPLE OF DETERMINATION OF GRADIENT
PROVIDED BY ACCELERATION SENSOR

ROAD GEOMETRY OF INTEREST TO BE DETERMINED

OUTPUTS FROM ACCELERATION SENSOR

METHOD AND APPARATUS FOR MAP MATCHING

BACKGROUND OF THE INVENTION

1. Field of the Invention

The present invention relates to a navigation apparatus and a map matching method. More particularly, the invention relates to a navigation apparatus that displays a map covering a vehicle position and its surroundings on a display device using map information, while displaying a mark indicative of the vehicle position on the map, and a map matching method.

2. Description of the Related Art

A navigation apparatus is designed to read map data corresponding to a present position of a vehicle from a map data storage section, such as a DVD or a HDD, and to draw the data read on a display screen, while moving a mark indicative of the vehicle position on the map according to travel of the vehicle, or while scrolling the map with the vehicle mark fixed in a set position (for example, in a center position of the display screen) on the screen.

The map data comprises (1) a road layer including node data, road link data, intersection data, and the like, (2) a background layer for displaying objects on the map, and (3) a character layer for displaying names of a city, a town, and a village and the like. A map image displayed on the display screen is generated based on the background layer and the character layer, whereas map matching processing and guidance-route search processing are performed based on the road layer.

In such a navigation apparatus, it is essential to measure a present vehicle position. Some measurement methods of the vehicle position have historically been put into practical use, for example, a measurement method for measuring the vehicle position using a distance sensor and an angle sensor (gyro) mounted on the vehicle (which is the so-called "autonomous navigation method"), a measurement method performed by a global positioning system (GPS) using satellite (which is the so-called "satellite navigation method"), and a measurement method using the combination of the above-mentioned methods.

In particular, the recent vehicle navigation apparatus makes use of the combination of the autonomous navigation and the satellite navigation methods. The navigation apparatus normally estimates or measures a position and an azimuth of the vehicle using the autonomous navigation method. Then, it modifies the measured or estimated vehicle position by map matching processing to determine a real vehicle position on a travel road of the map. If the map matching performed by a pattern matching method becomes impossible, the map matching processing is initialized, and a position measured by the GPS is set as the vehicle position at that time. Thereafter, the position and azimuth or heading of the vehicle are estimated again by the autonomous navigation method, and the map matching processing is restarted to match the estimated vehicle position to the real position on the map travel route.

In the autonomous navigation method, the vehicle position may be calculated by the following integration based on outputs from the distance sensor and the relative direction sensor. FIG. 7 is a diagram explaining a method of detecting a vehicle position using the autonomous navigation method. The distance sensor outputs a pulse every time the vehicle travels a unit distance $L_0$ (for example, 10 m). A reference azimuth ($\theta=0$) corresponds to a normal direction of the X axis. A counterclockwise direction relative to the reference azimuth is set as a positive direction, namely, + direction. A previous position of the vehicle is denoted as a point $P_0(X_0, Y_0)$, and an absolute azimuth of the vehicle travel direction or heading at a point $P_0$ is set as $\theta_0$. An output from the relative direction sensor at a time when the vehicle travels the unit distance $L_0$ is $\Delta\theta_1$. A change in the vehicle position will be calculated from the following equation.

$$\Delta X = L_0 \cdot \cos(\theta_0 + \Delta\theta_1)$$

$$\Delta Y = L_0 \cdot \sin(\theta_0 + \Delta\theta_1)$$

Further, an estimated azimuth $\theta_1$ of the heading of the vehicle at a present point $P_1$, and an estimated vehicle position $(X_1, Y_1)$ can be calculated by the following vector sum:

$$\theta_1 = \theta_0 + \Delta\theta_1 \quad (1)$$

$$X_1 = X_0 + \Delta X = X_0 + L_0 \cdot \cos\theta_1 \quad (2)$$

$$Y_1 = Y_0 + \Delta Y = Y_0 + L_0 \cdot \sin\theta_1 \quad (3)$$

Accordingly, once the absolute azimuth of the vehicle and coordinates of the position thereof at a starting point are specified by the GPS, then the vehicle position can be determined (estimated) in real time by repeatedly calculating the above-mentioned equations (1) to (3) every time the vehicle travels the unit distance.

In the autonomous navigation method, however, error accumulates over the course of the vehicle travel to cause the estimated vehicle position to deviate from a road or route. Then, the map matching processing is performed to verify the estimated vehicle position against the road data so as to match the estimated position to the real vehicle position on the map route.

FIG. 8 is a diagram explaining map matching using a projective method. The present vehicle position is set as a point $P_{i-1}(X_{i-1}, Y_{i-1})$, and a vehicle azimuth as $\theta_{i-1}$. (In the figure, the position $P_{i-1}$ is not located on a road RDa). When the vehicle travels a fixed distance $L_0$ (e.g. 10 m) from the point $P_{i-1}$, a vehicle position $P_i'(X_i', Y_i')$ estimated by the autonomous navigation and an estimated vehicle azimuth $\theta$ at the point $P_i'$ may be determined by the following equation wherein $\Delta\theta_i$ is a relative azimuth:

$$\theta_i = \theta_{i-1} + \Delta\theta_i$$

$$X_i' = X_{i-1} + L_0 \cdot \cos\theta_i$$

$$Y_i' = Y_{i-1} + L_0 \cdot \sin\theta_i$$

At this time, a link (serving as an element constituting a road) may be searched for which is located in a 200-square-meter area with the estimated vehicle position $P_i'$ positioned in the center thereof, wherein a perpendicular line is dropped from the link, an angle between a line with an estimated azimuth of the vehicle $\theta_i$ at the vehicle position $P_i'$ and the link is within a predetermined range (for example, not more than 45o), and a length of the perpendicular line dropped from the position $P_i'$ to the link is not more than a predetermined value (for example, 100 m). This may result in a link LKa1 with an azimuth $\theta a1$ on a road RDa (which is a line connecting nodes Na0 and Na1), and a link LKb1 with an azimuth $\theta b1$ on a road RDb (which is a line connecting nodes Nb0 and Nb1).

Then, lengths of perpendicular lines RLia and RLib dropped from the estimated vehicle position Pi' on the links LKa1 and LKb1 may be determined. Thereafter, coefficients Z may be calculated by the following equations:

$$Z = dL \cdot 20 + d\theta \cdot 20 \, (d\theta \leq 250) \quad (4)$$

$$Z = dL \cdot 20 + d\theta \cdot 40 \, (d\theta > 250) \quad (4)'$$

where dL is a length of the perpendicular line dropped from the estimated vehicle position Pi' onto the link (that is, a distance between the estimated position and the link), and dθ is an angle between the estimated vehicle azimuth $θ_i$ and the link. The larger the angle dθ, the larger the weight coefficient.

After the coefficient Z is determined, a link satisfying the following conditions 1) to 3) is selected which has the smallest value of coefficient Z as a matching candidate (optimal road), which is hereinafter referred to as a LKa1.

1) distance dL≦75 m (maximum drawing distance 75 m)
2) angular difference dθ≦300 (maximum drawing angle 300)
3) coefficient value Z≦1500

A travel locus SHi connecting the point Pi−1 and the point Pi' is moved in parallel toward the perpendicular line RLia until the point Pi−1 is superimposed on the link LKa1 (or on an extended line from the link LKa1) to determine moved points PTi−1 and Pti' which correspond to the points Pi−1 and Pi', respectively. (f) Last, the point PTi' is rotated around the point PTi−1 until it reaches the link LKa1 (or an extended line from the link LKa1) to determine a point after rotation, which is the real vehicle position Pi(Xi,Yi). Note that the heading of the vehicle at the real position Pi remains $θ_i$. Alternatively, when the point Pi−1, which is the previous vehicle position, is located on the road RDa as shown in FIG. 9, the moved point PTi−1 is identical to the point Pi−1.

For example, in a section where a highway HWY and a general road GRD are lied in parallel in a vertical stereostructure as shown in FIG. 10(A), and at an interchange where there are interchange roads RD1 and RD2 and a side road SRD leading from the lower road to the upper road as shown in FIG. 10(B), the measured vehicle position may happen, by mistake, to be matched onto the map road where the vehicle does not actually travel.

Thus, conventionally, information for specifying a gradient of a road link (upgrade, downgrade, or flat) is incorporated into the map database as disclosed in JP-A-10-253373. A gradient of the road link being presently traveled, that is, whether the road link is an upgrade or a downgrade, is detected using an acceleration outputted from an acceleration sensor. The gradient of the road link being traveled is verified against the link gradient information incorporated into the map information to perform the map matching processing without error even in the cases as shown in FIGS. 10(A) and 10(B).

For example, in cases where the general road GRD runs parallel to the highway HWY as shown in FIG. 11, when the vehicle is descending from an A point on the highway into the general road GRD through a ramp RMP, it is detected using an output from the acceleration sensor that the road link (ramp RMP) being currently traveled is a downgrade. In the map matching, the vehicle position is matched or drawn onto the downgrade ramp RMP of the map route, and then onto the general road GRD positioned thereunder.

In the conventional map matching processing using the acceleration sensor, an angle of inclination of the travel road is measured, and if the inclination angle measured is above a set angle, it is determined that the vehicle is currently traveling an upgrade link or a downgrade link.

The inclination angle is calculated using an acceleration outputted from the acceleration sensor and a derivative value (acceleration) of an instantaneous speed determined from a speed pulse. The acceleration outputted from the acceleration sensor fluctuates when the vehicle stops or starts. FIG. 12(B) is a diagram showing an output waveform of the acceleration sensor while the vehicle starts from a position A, descends a downgrade ramp RMP as shown in FIG. 12(A), stops at a position B, and then starts traveling again. As can be seen from the figure, the output from the acceleration sensor includes error caused by a swing back effect or the like due to the start or stop of the vehicle. This causes the wrong determination of gradient when the acceleration outputted from the acceleration sensor is verified against the gradient information stored in the map database.

In the conventional map matching processing using the acceleration sensor, an angle of inclination of the road being traveled is measured, and if the inclination angle measured is above a set angle, it is determined that the vehicle is currently traveling an upgrade link or a downgrade link. In the prior art, a road link sloping gently over a long distance with an inclination angle of the set angle or less cannot be judged correctly as an upgrade link or a downgrade link, which may lead to the wrong map matching processing.

Additionally, in the prior art, a road link including a steep slant and a flat part following the slant have not been judged correctly as the downgrade or upgrade link. This disadvantageously results in the wrong map matching.

SUMMARY OF THE INVENTION

In view of the foregoing problems, the present invention has an object to determine correctly that a vehicle is traveling a downgrade or upgrade link without being influenced by a swing back effect due to the start or stop of the vehicle so as to avoid wrong map matching processing.

The invention has another object to enable correct determination that even a road link sloping gently over a long distance is an upgrade or downgrade link to avoid the wrong map matching processing.

The invention has a further object to enable correct determination that even a road link with a steep slant is the upgrade or downgrade link to avoid the wrong map matching processing.

In one embodiment of the invention, there is provided a method for performing map matching in a navigation apparatus. The method comprises the steps of incorporating data for specifying a gradient of a road link into map information, detecting an acceleration of a vehicle by an acceleration sensor, determining an angle of inclination of the road link being currently traveled or a value corresponding to the inclination angle using the acceleration, determining a vertical distance traveled at predetermined time intervals from the inclination angle determined or the angle corresponding thereto and from a speed of the vehicle to accumulate the distances, each serving as a vertical deviation, determining that the road link being traveled is an upgrade link or a downgrade link when the accumulated value of the vertical deviations is larger than a set value, and performing map matching processing using a result of the determination and data on the gradient.

In another embodiment of the invention, there is provided a navigation apparatus for displaying a map covering a position of a vehicle and surroundings thereof on a display device using map information, while displaying a mark indicative of the vehicle position on the map, which apparatus comprises a storage section for storing therein the map information including data for specifying a gradient of a road link, an acceleration sensor for detecting an acceleration of the vehicle, an inclination calculator for determining an angle of inclination of the road link being currently traveled, or a value corresponding to the angle of inclination using the acceleration, a vertical-deviation accumulator for determining a vertical distance traveled at predetermined time intervals from the inclination angle determined or the angle corresponding thereto and from a speed of the vehicle to accumulate the distances, each serving as a vertical deviation, a determination section for determining that the road link being traveled is an upgrade link or a downgrade link when the accumulated value of the vertical deviations is larger than a set value, and a map matching processor for performing map matching processing using a result of the determination and data on the gradient.

According to an embodiment of the invention, it is determined that the vehicle is traveling an upgrade link or a downgrade link when the accumulated value of vertical deviations at predetermined intervals is equal to or more than the set value. Thus, even when a swing back effect or the like due to the start or stop of the vehicle results in failure to correctly measure the inclination angle, each vertical deviation to be accumulated is so small that it does not affect the entire accumulated value of the vertical derivations. This enables correct determination that the vehicle is traveling the upgrade link or downgrade link to avoid the wrong map matching.

According to an embodiment of the invention, the determination of the upgrade or downgrade being traveled by the vehicle is not based on an angle of inclination, but based on whether or not the accumulated value of the vertical deviations is equal to or more than the set value. This enables correct determination of the upgrade or downgrade link even when the vehicle travels the road link sloping gently over the long distance to avoid the wrong map matching.

According to an embodiment of the invention, the determination of the upgrade or downgrade being traveled by the vehicle is not based on an angle of inclination, but based on whether or not the accumulated value of the vertical deviations is equal to or more than the set value. This enables correct determination of the upgrade or downgrade link even when the vehicle travels a short steep slant and then a flat road to avoid the wrong map matching.

BRIEF DESCRIPTION OF THE DRAWINGS

FIG. 4 is a diagram explaining a link record;

DESCRIPTION OF THE PREFERRED EMBODIMENTS

Figure 1:
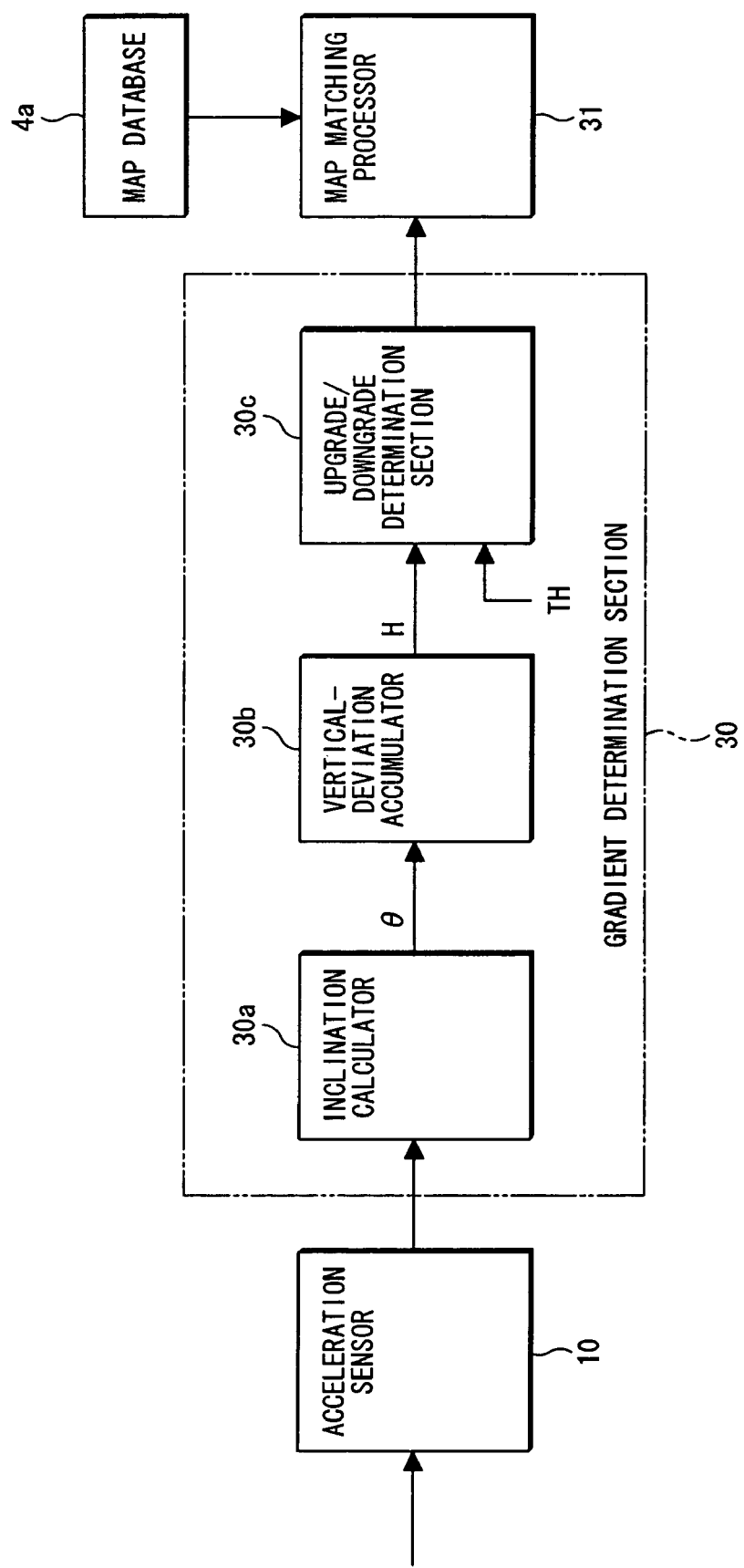
FIG. 1 is a diagram explaining one preferred embodiment of the invention.

FIG. 1 is a diagram explaining one preferred embodiment of the invention.

In a navigation apparatus for displaying a map covering a position of a vehicle and its surroundings on a display device using map information, while displaying a mark indicative of the vehicle position on the map, a map database 4a stores therein map information including data for specifying a gradient of a road link. An acceleration sensor 10 detects an acceleration of the vehicle. An inclination calculator 30a of a gradient determination section 30 determines an angle of inclination θ of the road link being currently traveled, or a value (sin θ) corresponding to the angle θ, using the acceleration detected by the acceleration sensor. A vertical-deviation accumulator 30b determines a vertical distance traveled at predetermined time intervals ΔT from the inclination angle determined and from a speed of the vehicle to accumulate the distances, each serving as a vertical deviation. An upgrade/downgrade determination section 30c determines that the road link being traveled is an upgrade link or a downgrade link when the accumulated value of the vertical deviations H is larger than a set value TH. A map matching processor 31 performs map matching processing using a result of the determination and information on the gradient.

Figure 2:
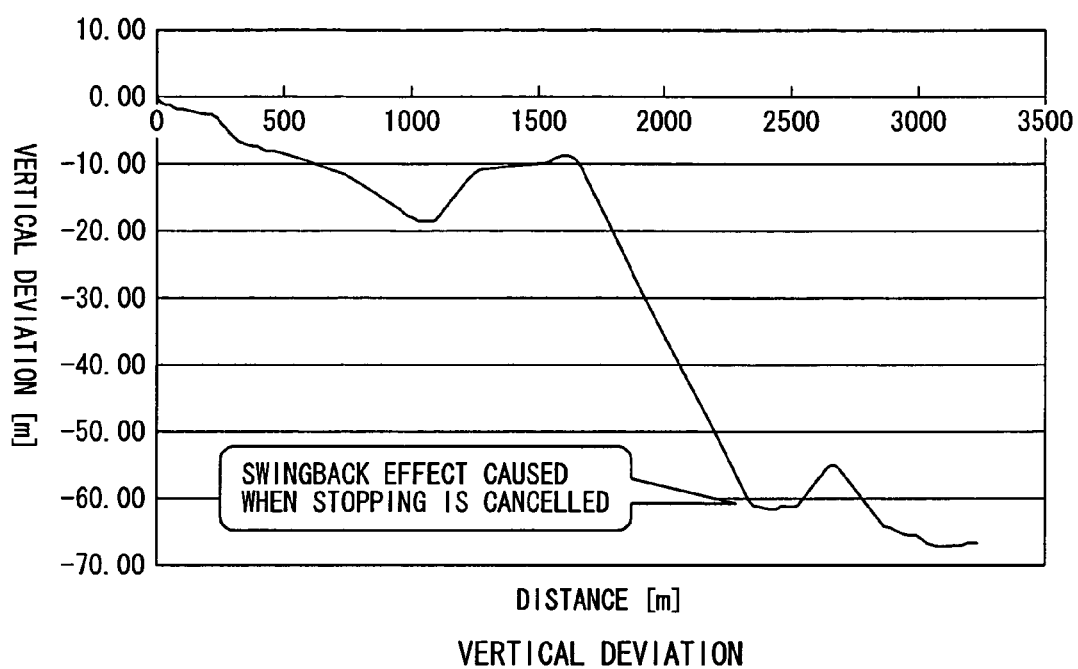
FIG. 2 shows an example of a graph of a vertical deviation measured.

The vertical-deviation accumulator 30b calculates the accumulated value of the vertical deviations H from when the vehicle starts to descend or ascend by the following equation:

$$H = \sum_i V_i \Delta T \sin\theta_i \qquad (5)$$

where θi is an $i^{th}$ inclination angle measured at the predetermined time intervals ΔT, and Vi is the vehicle speed. Even when a swing back effect or the like caused due to the start or stop of the vehicle results in failure to correctly measure the inclination angle, $V_i \Delta T$ is so small and thus each vertical deviation to be accumulated is so small that it does not affect the entire accumulated value of the vertical derivations H. That is, fluctuations in the vertical deviations due to the swing back effect or the like do not appear as shown in a graph of vertical deviations of FIG. 2, thereby enabling correct determination that the vehicle is traveling the downgrade/upgrade link to avoid the wrong map matching.

Figure 3:
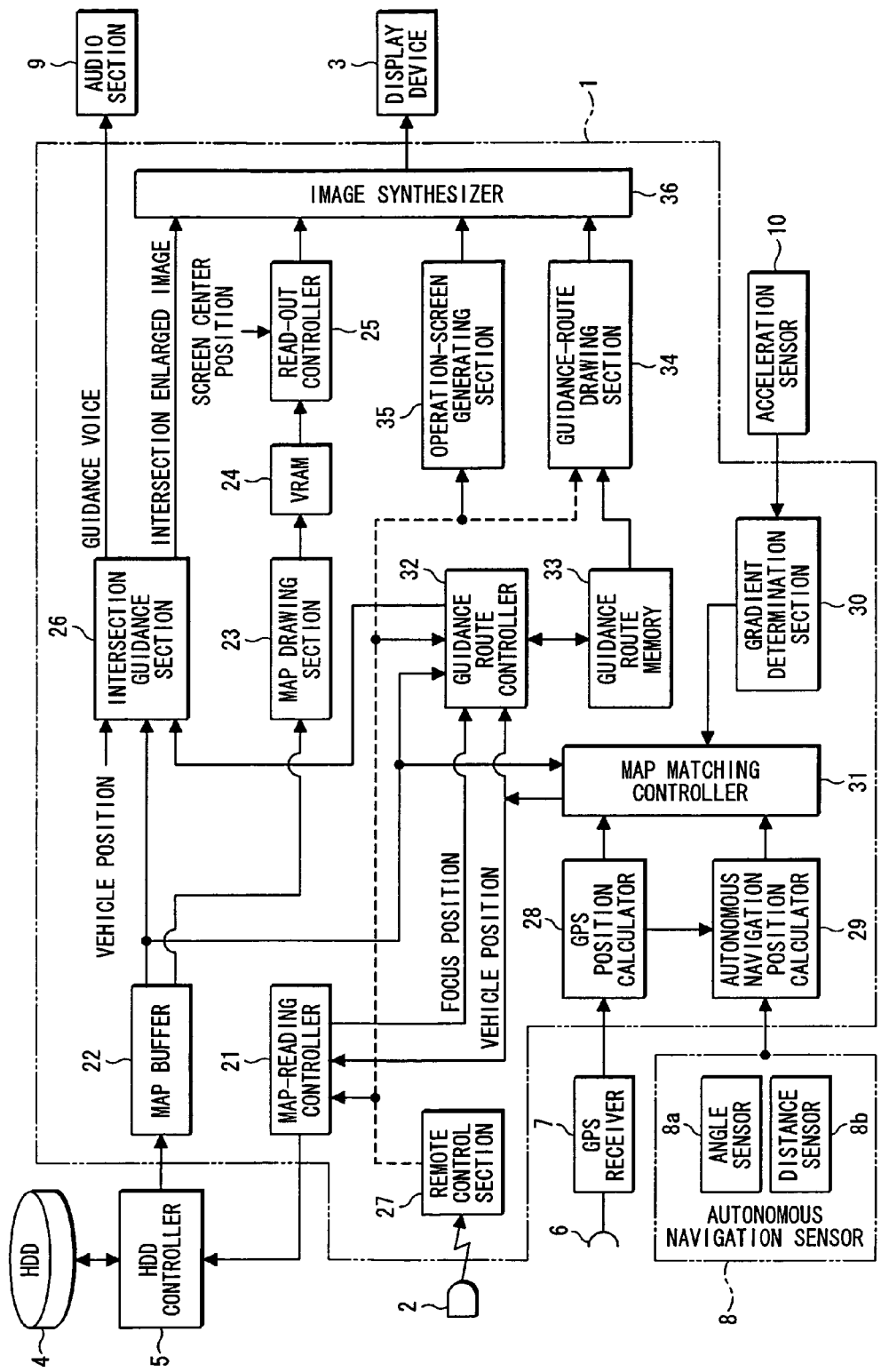
FIG. 3 is a diagram showing a configuration of a navigation system employing a map matching method of the invention.

FIG. 3 shows a configuration diagram of a navigation system employing a map matching method. The navigation system includes a navigation controller 1, a remote controller 2, a display device (color monitor) 3, a hard disk (HDD) 4, a HDD controller 5, a multi-beam antenna 6, a GPS receiver 7, a autonomous navigation sensor 8, an audio section 9, and an acceleration sensor 10. The hard disk (HDD) 4 stores therein a map database 4a which includes information on nodes or links constituting roads, and information on intersection. FIG. 4 is a diagram explaining a link record, which comprises data, such as a link ID, the number of nodes located at both ends of a link, a distance between links, a road classification flag, a traffic regulation flag, and gradient information indicative of classification of upgrade/downgrade/flat.

The autonomous navigation sensor 8 includes a relative direction sensor (angle sensor) 8a, such as a vibrating gyro, for detecting a rotational angle of the vehicle, and a distance sensor 8b for generating one pulse at predetermined travel intervals.

In the navigation controller 1, a map-reading controller 21 controls the HDD controller 5 based on the vehicle position or the like to read predetermined map information from the HDD 4. A map buffer 22 stores therein the map information read from the HDD, and also stores therein a plurality of pieces of (a plurality of units of) map information about the vehicle position or an area surrounding a focus position, for example, map information in 3×3 units, so as to scroll the map.

A map drawing section 23 generates a map image using the map information stored in the map buffer 22. A VRAM 24 stores therein the map image. A read-out controller 25 reads an image from the VRAM 24, changing the position of the image for one screen piece based on the vehicle position to scroll the map in accordance with the movement of the vehicle position.

An intersection guidance section 26 displays an enlarged view of an intersection being approached to provide guidance on a travel direction to be taken at the intersection by the displayed image or by voice. That is, in performing actual route guidance, when the vehicle reaches a predetermined distance from the intersection being approached, a guidance view of the intersection (that is, an intersection enlarged view, an arrow of travel direction) is displayed on the display screen, while the travel direction to be taken at the intersection is recommended by voice. A remote control section 27 receives a signal in response to an operation of the remote controller to give a command to each component. Note that instead of the remote controller, an input device, such as a touch panel, can be used. A GPS position calculator 28 calculates the present vehicle position (GPS position) and the vehicle azimuth or heading based on the GPS data input from the GPS receiver. A autonomous navigation position calculator 29 calculates the vehicle position and azimuth using the autonomous navigation method with the GPS position set as an initial position. That is, the autonomous navigation position calculator 29 calculates the vehicle position (estimated vehicle position) and vehicle azimuth based on outputs from the autonomous navigation sensor. A gradient determination section 30 determines whether the road being traveled is upgrade, downgrade, or flat, using the acceleration of the vehicle detected by the acceleration sensor 10 to input a result of the determination into a map matching processor 31.

As explained in FIG. 1, the gradient determination section 30 determines an inclination angle $\theta_i$ of the road link being currently traveled, or $\sin \theta_i$, using the acceleration detected by the acceleration sensor 10. Further, it determines a vertical distance traveled at predetermined time intervals $\Delta T$ from the inclination angle determined or $\sin \theta$, and from a speed of the vehicle to accumulate the distances, each serving as a vertical deviation. When the accumulated value of the vertical deviations H is larger than the set value TH, it is determined that the road link being traveled is an upgrade link or downgrade link to input the determination into the map matching processor 31.

Figure 5:
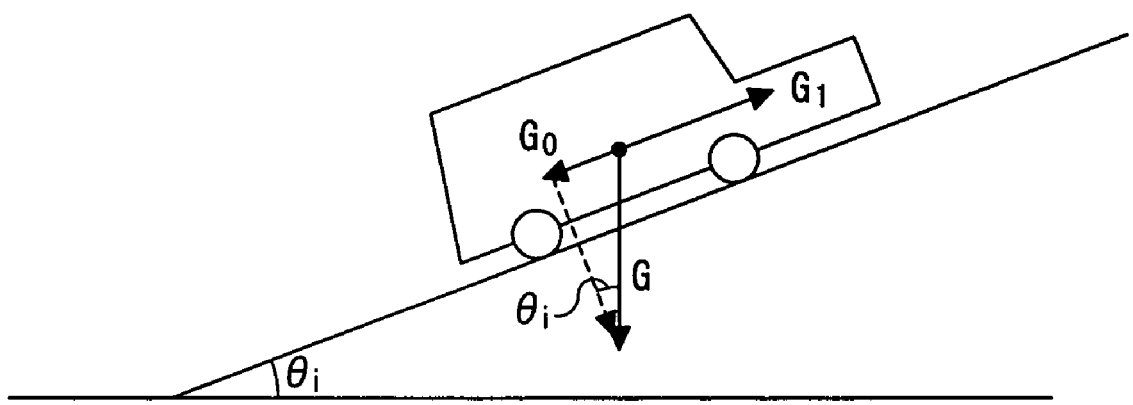
FIG. 5 is a diagram explaining the principle of measurement of an inclination angle $\theta_i$ performed by a gradient determination section.

FIG. 5 is a diagram explaining the principle of measurement of an inclination angle $\theta_i$ performed by the gradient determination section 30. Although the measurement of the inclination angle of the upgrade link will be described below, an inclination angle of the downgrade link may be measured in the same manner. The vehicle or car experiences an acceleration due to gravity G in the vertical direction. The component of the acceleration due to gravity parallel to the surface is $G_0$. The following equation is satisfied:

$$G_0 = G \cdot \sin \theta_i$$

When the vehicle is accelerating, an acceleration of the vehicle in the travel direction is with the movement of the vehicle $G_1$. The acceleration $G_1$ is determined by differentiation of an instantaneous speed of the vehicle, which is calculated from a distance between positions where speed pulses are generated. An acceleration $G_2$ of the vehicle detected by the acceleration sensor 10 is represented by the following equation:

$$G_2 = G_1 - G_0$$

Therefore, the following equation is obtained:

$$G_0 = G_1 - G_2 = G \cdot \sin \theta_i$$

The inclination angle $\theta i$ is determined as follows:

$$\sin \theta_i = (G_1 - G_2)/G \qquad (6)$$

or $$\theta_i = \sin^{-1}(G_1 - G_2)/G \qquad (7)$$

When $\theta_i$ is the $i^{th}$ inclination angle measured at intervals of $\Delta T$, and $V_i$ is the vehicle speed, the accumulated value of vertical deviations H from when the vehicle starts to ascend is represented by the equation (5). Thus, the gradient determination section 30 determines that the road link being traveled is an upgrade link when the accumulated value of vertical deviations H is larger than the set value TH, and inputs the result of the determination into the map matching processor 31.

Turning to FIG. 3, the map matching processor 31 performs the map matching processing using the projective method. More specifically, the processor 31 performs the map matching processing using the map information (including gradient information) read in the map buffer 22, the estimated position/azimuth of the vehicle, and the determination result of upgrade/downgrade/flat of the road being traveled to match the vehicle position onto the road link being traveled. For example, the conventional map matching processing is carried out to determine candidates of road links for the map matching. One or more roads are selected from among these candidates which are matched with the determination result of the upgrade/downgrade/flat detected. If the number of the roads selected as the candidate is one, the road is judged as the candidate for matching (appropriate road). If the number of the roads selected as the candidate is two or more, the road with the smallest coefficient value Z (see equations (4) and (4)') is judged as the matching candidate.

A guidance route controller 32 performs calculation processing of a guidance route (route searched for) from a starting point input to a destination. A guidance route memory 33 stores therein the guidance route. A guidance route drawing section 34 reads information on the guidance route (node strings) from the guidance route memory 33 when the vehicle travels, and draws the guidance route. An operation-screen generating section 35 generates various kinds of menu screens (operation screens). An image synthesizer 36 synthesizes various images and outputs the synthesized one.

Figure 6:
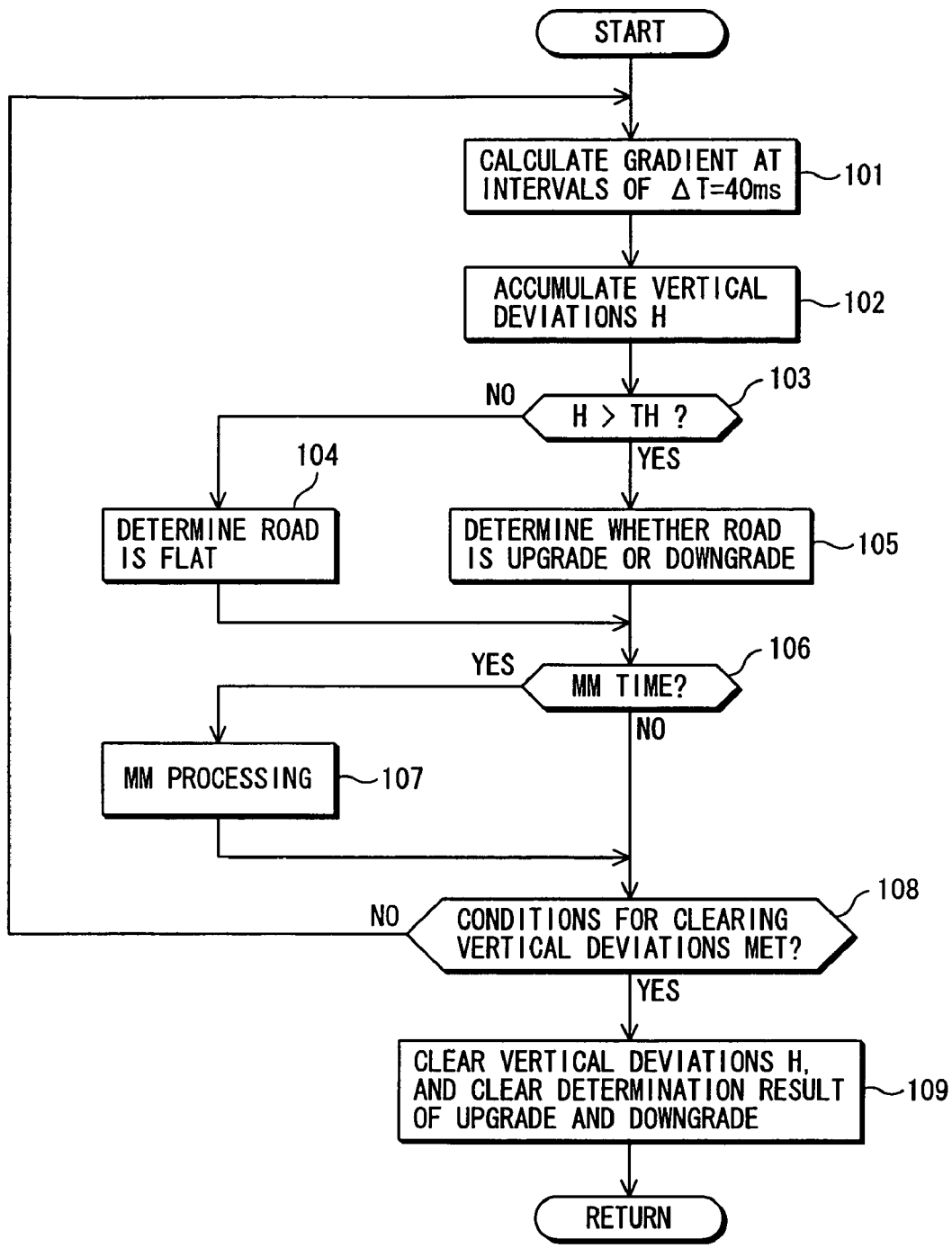
FIG. 6 is a flowchart of map matching processing of the invention.
Figure 7:
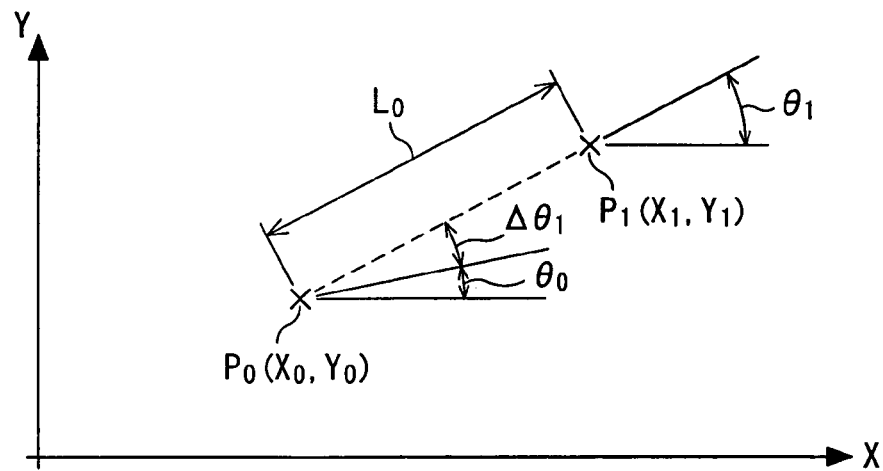
FIG. 7 is a diagram explaining a method of detecting a vehicle position using a autonomous navigation method.
Figure 8:
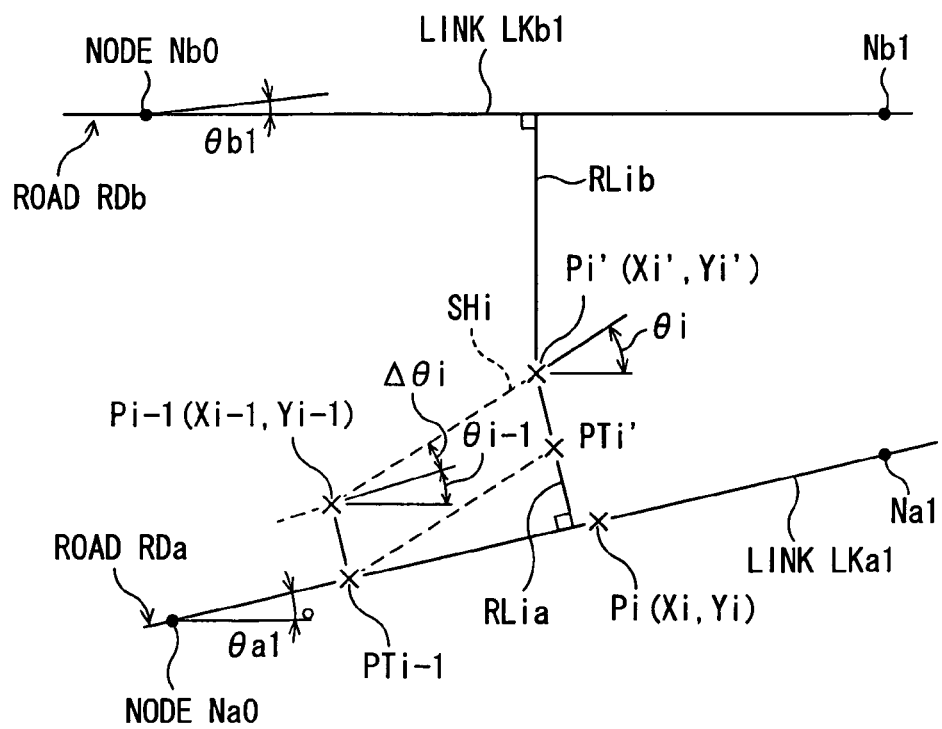
FIG. 8 is a diagram explaining map matching using a projective method.
Figure 9:
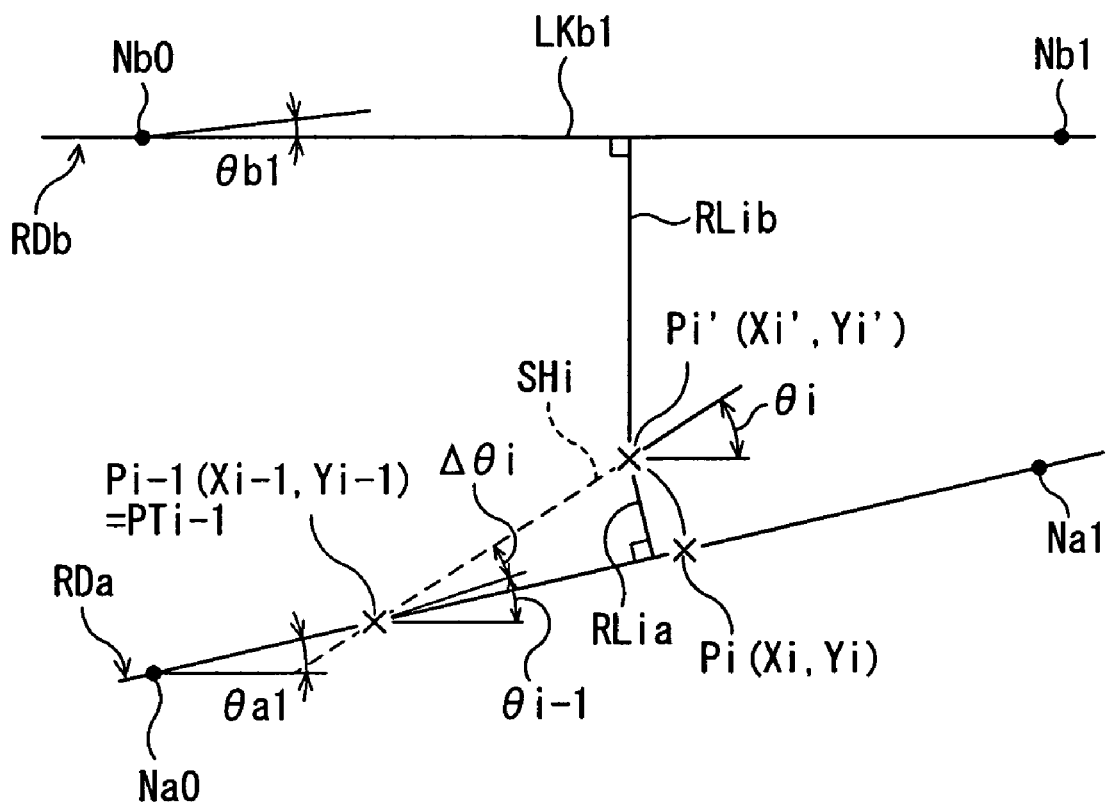
FIG. 9 is another diagram explaining the map matching using the projective method.
Figure 10:
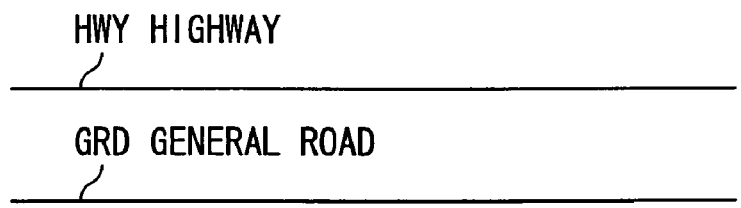
FIG. 10 shows examples of stereoscopic roads in which a vehicle position is matched onto a wrong map route not being actually traveled.
Figure 10:
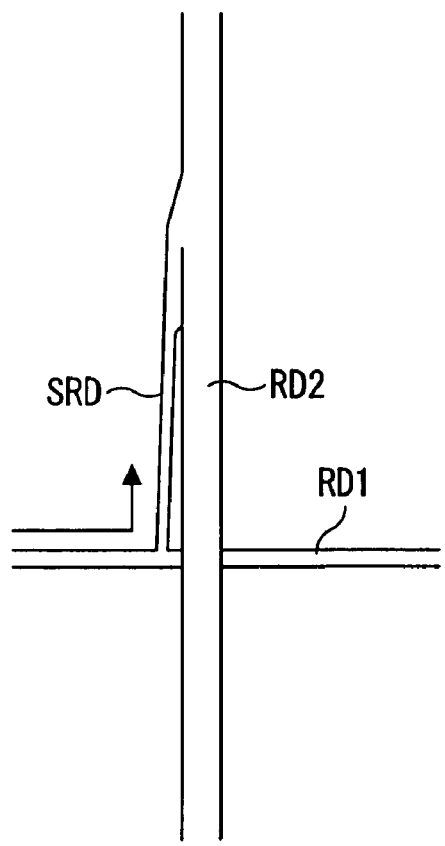
Figure 11:
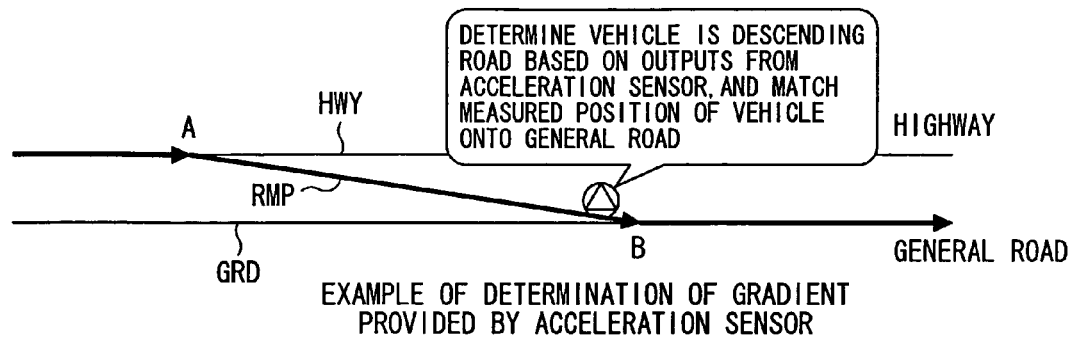
FIG. 11 is an explanatory diagram of the conventional map matching processing using gradient information.
Figure 12:
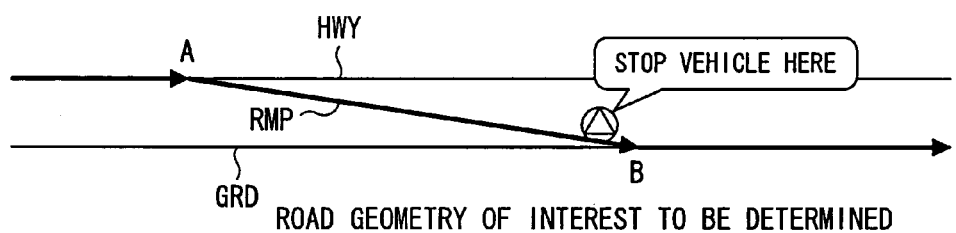
FIG. 12 is a diagram showing an output waveform of an acceleration sensor.
Figure 12:
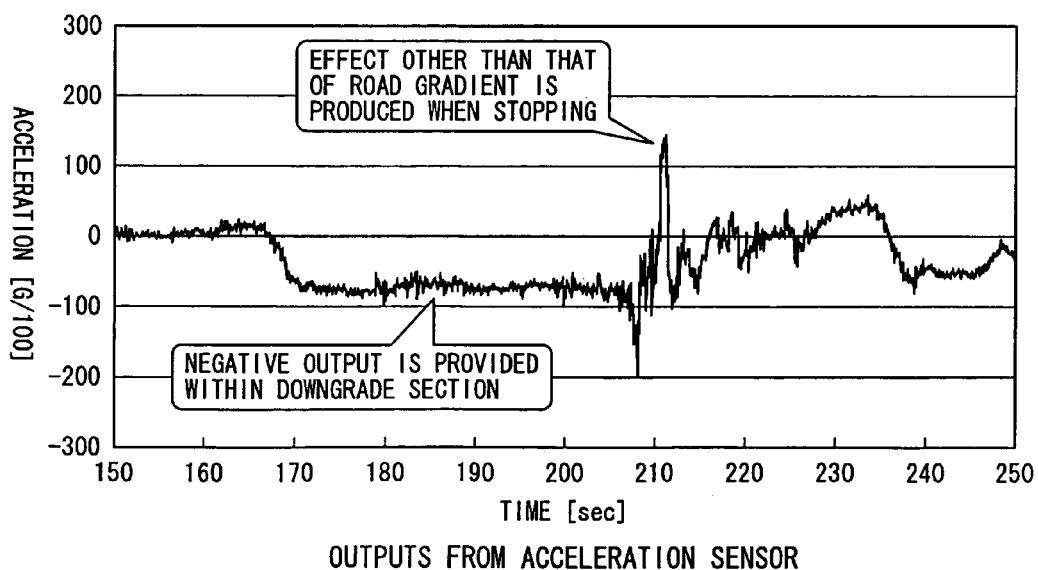

FIG. 6 is a flowchart showing map matching processing. The gradient determination section 30 calculates a gradient (inclination) of a road link being traveled at predetermined intervals of $\Delta T$ (for example, 40 msec) using an acceleration detected by the acceleration sensor 10 (step 101), and accumulates vertical deviations using the above equation (5). Then, it is checked whether or not the accumulated value of the vertical deviations H is larger than a threshold value TH (step 103). If no, it is determined that the road being traveled is flat (step 104). If yes, that is, if the accumulated value H is larger than the threshold value TH, it is determined that the road link being traveled is an upgrade link (+ sign) or a downgrade link (− sign) based on the sign of the acceleration outputted from the acceleration sensor (step 105). Then, it is determined whether the map matching processing time has come or not (step 106). If the processing time has come, the map matching processor 31 performs the map matching processing using the map information (including gradient information), the estimated position/azimuth of the vehicle, and the determination result of upgrade/downgrade/flat of the detected road being traveled to match the vehicle position on the road link of the map being traveled, thereby modifying the position (step 107).

Then, it is determined whether conditions for clearing vertical deviations are met or not, for example, whether or not the vehicle has traveled a set distance since starting to calculate the accumulated value of the vertical deviations (step 108). If not, the operation returns to the step 101, and the following steps are repeatedly performed. If yes, that is, if the vehicle has traveled the set distance, the accumulated value of the vertical deviations is cleared to zero, and the determination result of upgrade/downgrade/flat is also cleared (step 109). Subsequently, the operation returns to the first step. Note that the above-mentioned processing is performed after the vehicle has passed a junction.

In the above description, although the information on the gradient of the link is incorporated into the link record, a data list of road constructions may be incorporated into the map database, and the gradient of the link can be specified by the construction data in the data list.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A navigation apparatus for displaying a map covering a position of a vehicle and surroundings thereof, the apparatus comprising:
    a storage section operable to store map information including data for specifying a gradient of a road link;
    an acceleration sensor operable to detect acceleration of the vehicle;
    an inclination calculator operable to determine an angle of inclination of a currently traveled road link based on a detected acceleration of the vehicle, or to determine a value corresponding to the angle of inclination based on the detected acceleration of the vehicle;
    a vertical-deviation accumulator operable to determine a vertical distance traveled on the currently traveled road link based on at least two angles of inclination determined based on the currently traveled road link or at least two values corresponding to angles of inclination determined based on the currently traveled road link that were determined by the inclination calculator based on accelerations of the vehicle detected along the currently traveled road link, and to output an accumulated value of vertical deviations;
    a gradient determination section operable to determine if the currently traveled road link is an upgrade link or a downgrade link when the accumulated value of the vertical deviations is larger than a set value; and
    a map matching processor operable to perform map matching processing using data from the gradient determination section.

2. The navigation apparatus of claim 1, wherein said vertical-deviation accumulator calculates the accumulated value of the vertical deviations H from when the vehicle starts to descend or ascend by the following equation:

$$H = \sum_i V_i \Delta T \sin\theta_i$$

where $\theta_i$ is an $i^{th}$ inclination angle measured at the predetermined time intervals $\Delta T$ and $V_i$ is the vehicle speed.

3. The navigation apparatus of claim 2, wherein said gradient determination section calculates the gradient of the currently traveled road link at predetermined time intervals $\Delta T$ using the acceleration detected by the acceleration sensor, determines the accumulated value of the vertical deviations H by said equation, checks whether the accumulated value of the vertical deviations H is larger than a threshold value, and determines that the travel road is flat if the accumulated value is not larger than the threshold value and that the travel road link is an upgrade link or a downgrade link based on a sign of the acceleration outputted from the acceleration sensor if the accumulated value is larger than the threshold value.

4. The navigation apparatus of claim 3, wherein said gradient determination section monitors whether the vehicle has traveled a set distance since starting to calculate the accumulated value of the vertical deviations H, and clears the accumulated value of the vertical deviations and the result of determination of upgrade/downgrade/flat when the set distance is exceeded.

5. The navigation apparatus of claim 3, wherein said map matching processor performs the map matching processing using map information, an estimated position/azimuth of the vehicle, and data from the gradient determination section to match vehicle position onto the travel road link of the map.

6. A method for performing map matching processing in a navigation apparatus, the method comprising the steps of:
    receiving data relating to a gradient of a road link;
    detecting a first acceleration of a vehicle on a road link;
    detecting a second acceleration of the vehicle on the road link;
    determining, based on the first acceleration of the vehicle, a first angle of inclination of the road link being currently traveled or a value corresponding to the first inclination angle;
    determining, based on the second acceleration of the vehicle, a second angle of inclination of the road link being currently traveled or a value corresponding to the second inclination angle;
    determining an accumulated vertical deviation from at least the determined first and second inclination angles or values corresponding thereto and from vehicle speed data;
    determining that the road link being traveled is an upgrade link or a downgrade link when the accumulated vertical deviation is larger than a set value; and
    performing the map matching processing.

7. A method for performing map matching processing in a navigation apparatus, the method comprising the steps of:
    incorporating data specifying a gradient of a road link;
    calculating the gradient of the road link being traveled at predetermined time intervals using accelerations detected by an acceleration sensor;
    accumulating vertical deviations that were determined based on the accelerations detected by the acceleration sensor along the road link being traveled;
    checking whether the accumulated value of the vertical deviations is larger than a threshold value;

determining that the road link being traveled is flat if the accumulated value is not larger than the threshold value; and determining that the road link being traveled is an upgrade link or a downgrade link based on a sign of the acceleration outputted from the acceleration sensor if the accumulated value is larger than the threshold value.

8. The method of claim 7, further comprising the steps of:

checking whether map matching processing should be performed at the current time; and performing map matching processing using the map information, an estimated position/azimuth of the vehicle, and the accumulated value result onto the travel road link of the map, thereby modifying the position.

9. The method of claim 8, further comprising the steps of:

monitoring whether the vehicle has traveled a set distance since starting to calculate the accumulated value of the vertical deviations; and if the set distance is exceeded, resetting the accumulated value of the vertical deviations.

10. The method of claim 7, wherein accumulating vertical deviations is performed by using the following equation:

$$H = \sum_i V_i \Delta T \sin\theta_i$$

where $\theta_i$ is an $i^{th}$ inclination angle measured at the predetermined time intervals $\Delta T$, $V_i$ is the vehicle speed, and H is the accumulated value of the vertical deviations from when the vehicle starts to descend or ascend.

* * * * *